J. S. DOUGLASS.
TRACE HOLDER.
APPLICATION FILED FEB. 17, 1908.
911,218. Patented Feb. 2, 1909.
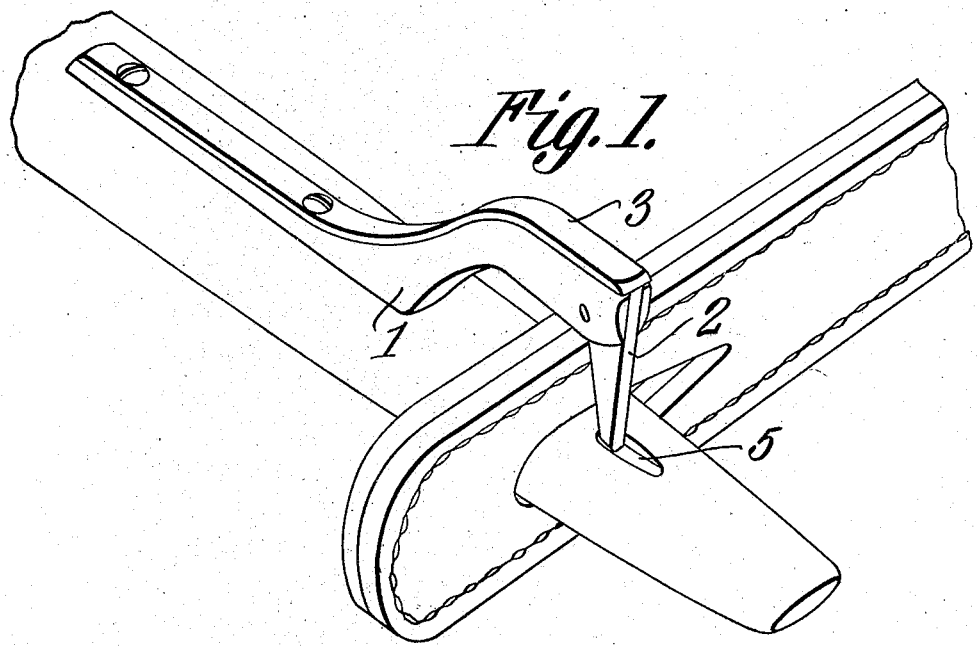
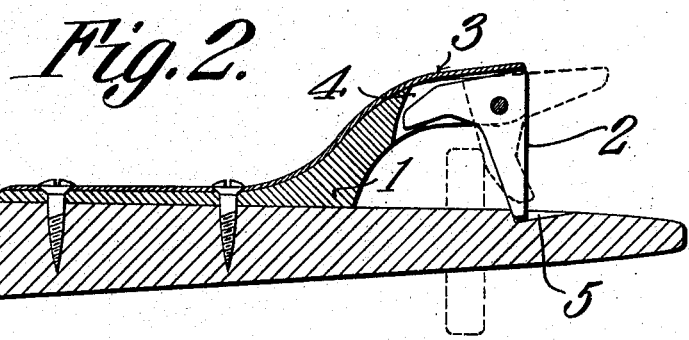
Witnesses
Inventor
James S. Douglass.
By
Attorneys

UNITED STATES PATENT OFFICE.

JAMES S. DOUGLASS, OF PARIS, KENTUCKY, ASSIGNOR OF ONE-HALF TO ELIAS B. WRENN, OF LEXINGTON, KENTUCKY.

TRACE-HOLDER.

No. 911,218.            Specification of Letters Patent.            Patented Feb. 2, 1909.

Application filed February 17, 1908. Serial No. 416,396.

*To all whom it may concern:*

Be it known that I, JAMES S. DOUGLASS, a citizen of the United States, residing at Paris, in the county of Bourbon and State of Kentucky, have invented a new and useful Trace-Holder, of which the following is a specification.

My invention relates to certain improvements in tug fasteners, more particularly that class employing a leather trace member slipped over the end of a swingle or whiffle tree.

It has for its object to provide for the effective retention of the trace as against accidental displacement, to carry out this end in a simple economical manner, as well as by the employment of a minimum number of parts.

Said invention consists in the combination, construction and arrangement of parts substantially as hereinafter more fully disclosed and specifically pointed out by the claim.

In the accompanying drawing illustrating the preferred embodiment of my invention— Figure 1 is a perspective view of a portion of a swingle tree equipped with my device and showing a portion of a tug in position thereon. Fig. 2 is a vertical median section through the swingle tree and my device, the open position thereof being shown in dotted lines and the closed position being shown in full lines.

Similar numerals of reference are employed to indicate corresponding parts throughout the several figures of the drawings.

In carrying out my invention, I secure to the upper surface of a whiffletree a bracket 1, preferably of the general outline disclosed, the same having a longitudinal portion secured to the whiffletree, and the end portion thereof adapted to overhang the latter. The hook or fastener 2 is preferably of general right-angled outline, having its angle pivoted to the outstanding end of the overhanging portion of the bracket 1 and held under tension or spring pressure preferably by a flat plate spring 3, said spring holding said hook or fastener in fixed position either when the trace is connected to the whiffletree or removed therefrom. Said bracket has its overhanging portion longitudinally slotted as at 4, in order to sink one arm of said hook within said bracket, especially as when in locked position.

The spring 3 is preferably secured along the upper longitudinal surface of the bracket 1 in any suitable manner, the outer upper end thereof conforming to the overhanging portion of said bracket and, of course, is free to be sprung away therefrom or press upon the hook, according as the hook or fastener is moved upon its pivot in inserting and withdrawing the trace from said hook. The outer end of the whiffle-tree in its upper surface is provided preferably with a cavity or notch 5 adapted to receive the free end of said hook or fastener, and is adapted to serve as a stop for effectively limiting the inward movement of said end of the hook or fastener.

It will be noticed by the peculiar construction of the spring and hook, when the point of the hook passes slightly beyond the line of pressure of the spring passing through the pivot, the spring will act to complete the movement of the hook in either direction according as the point lies outside or inside said line of pressure. It will further be noticed that by the peculiar construction of the spring and bracket the openings for the screws holding the bracket on the swingle tree correspond with the openings in the springs. It is thus possible to hold the parts together with the same screws that attach the brackets to the swingle tree.

It will be noted that this device is exceedingly simple and readily constructed, embracing a minimum number of parts, and is effective for the retention of the trace in locked position and as against possible accidental displacement, and is readily manipulated simply by the insertion and withdrawal of the trace alone, rendering it expeditious in operation.

It will be understood that any variations in the details as to structural outline of my invention may be readily made without departing from the spirit of my invention and the same yet remaining intact to be protected.

I claim:—

A tug fastener comprising a bracket adapted to be secured to a swingle tree provided with a plurality of holes for securing means, an overhanging free end formed on said bracket, a hook pivotally mounted on the overhanging end provided with outer faces disposed substantially at right angles to each other and a pair of arms substantially in right angled relation, a spring provided with a plurality of openings arranged to register with openings in the bracket and conforming to the shape of said bracket, held on the bracket and having its outer end pressing against one of the angled faces of the hook.

In testimony that I claim the foregoing as my own, I have hereto affixed my signature in the presence of two witnesses.

JAMES S. DOUGLASS.

Witnesses:
   CHRISTY PARK,
   W. C. G. HOBB.